United States Patent
He et al.

(10) Patent No.: US 10,621,256 B2
(45) Date of Patent: Apr. 14, 2020

(54) DETERMINING A RATE FOR SAMPLING INFORMATION DESCRIBING PRESENTATION OF CONTENT BASED ON PREVIOUSLY RECEIVED INFORMATION DESCRIBING PRESENTATION OF CONTENT

(71) Applicant: Facebook, Inc., Menlo Park, CA (US)

(72) Inventors: Honglu He, Santa Clara, CA (US); Li Tan, Fremont, CA (US); David Harry Garcia, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 321 days.

(21) Appl. No.: 15/721,671

(22) Filed: Sep. 29, 2017

(65) Prior Publication Data
US 2019/0102468 A1  Apr. 4, 2019

(51) Int. Cl.
| | |
|---|---|
| *G06F 16/9535* | (2019.01) |
| *G06Q 30/02* | (2012.01) |
| *H04L 29/08* | (2006.01) |
| *G06Q 50/00* | (2012.01) |
| *G06F 16/9536* | (2019.01) |

(52) U.S. Cl.
CPC ...... *G06F 16/9535* (2019.01); *G06F 16/9536* (2019.01); *G06Q 30/0282* (2013.01); *G06Q 50/01* (2013.01); *H04L 67/22* (2013.01); *H04L 67/306* (2013.01)

(58) Field of Classification Search
CPC .......... G06Q 30/0277; G06Q 30/0242; G06Q 30/02; G06F 16/24578; G06F 16/9535; H04N 21/6125
See application file for complete search history.

(56) References Cited

U.S. PATENT DOCUMENTS

| | | | | |
|---|---|---|---|---|
| 7,305,483 | B2 * | 12/2007 | Yao | H04N 21/6125 |
| | | | | 375/E7.02 |
| 2013/0046615 | A1 * | 2/2013 | Liyanage | G06Q 30/0242 |
| | | | | 705/14.45 |
| 2014/0207793 | A1 * | 7/2014 | Liu | G06Q 30/0277 |
| | | | | 707/748 |
| 2015/0156542 | A1 * | 6/2015 | Covell | G06Q 30/02 |
| | | | | 725/18 |
| 2016/0188596 | A1 * | 6/2016 | Keggi | G06F 16/24578 |
| | | | | 703/11 |

* cited by examiner

*Primary Examiner* — Etienne P Leroux
(74) *Attorney, Agent, or Firm* — Fenwick & West LLP (57) ABSTRACT

An online system logs information describing presentation of content items, such as actions performed with presented content items or descriptions of presentation of content items, and uses the logged information to recommend other content items. Because of a large amount of information describing content item presentation, the online system samples the information and stores the resulting samples. To improve accuracy of the sampling, the online system adapts the sampling rate for different types of information describing presentation of content items based on amounts of the different types of information received during a specific time interval.

18 Claims, 3 Drawing Sheets

DETERMINING A RATE FOR SAMPLING INFORMATION DESCRIBING PRESENTATION OF CONTENT BASED ON PREVIOUSLY RECEIVED INFORMATION DESCRIBING PRESENTATION OF CONTENT

BACKGROUND

This disclosure relates generally to presenting content to users of an online system, and more specifically to recommending actions for a user to perform based on actions by users logged by the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems may recommend actions to their users to encourage or to increase user interaction with the online systems. For example, if a publishing user provides content to an online system for presentation to other users, the online system may recommend one or more actions to the publishing user to increase a number of users to whom the content is presented or to increase likelihoods of users viewing the content. Many online systems recommend actions to users based on actions performed by other users and logged by an online system, such as actions performed by users after being presented with one or more recommended actions. Based on the logged actions by other users, the online system recommends an action to the publishing user.

However, many online systems have large numbers of users performing large numbers of actions and present large number of recommended actions. Because of the large number of actions and amount of content presented, logged actions and information describing content presentation are sampled by an online system, with the sampled data used to recommend actions to a user. However, different actions or presentations of content generate different amounts of information logged by an online system, so sampling different actions or presentations of content at a common sampling rate may fail to sufficiently reduce the amount of information accessed by the online system for certain actions or presented content while overly reducing the amount of information accessed by the online system for other actions or other presented content.

SUMMARY

Publishing users provide content to an online system, which may identify one or more recommended actions for a publishing user to perform to increase presentation of the content to other users or to increase interaction with the content by other users. For example, a recommended action identifies a distribution channel for content provided by the publishing user or describes a format for the content to increase a likelihood of users interacting with the content. As another example, a recommended action presents recommended values for one or more characteristics of a content item to the publishing user. The online system selects recommended actions for one or more publishing users based on prior presentation of descriptions of various recommended actions to users and actions with the descriptions of recommended actions by users to whom the descriptions of recommended actions were presented. For example, the online system maintains a log of descriptions of recommended actions presented to various users and actions performed by users with the descriptions of recommended actions. The online system applies one or more models to characteristics of a publishing user, characteristics of a content item provided to the online system by the publishing user, characteristics of users who performed one or more actions with previously presented descriptions of recommended actions, and characteristics of one or more content items provided to the online system by the users who performed the one rom reo actions with previously presented descriptions of recommended actions.

Accordingly, the online system transmits descriptions of recommended actions to client devices associated with users of the online system providing content items to the online system for presentation to other users. In some embodiments, the online system transmits a description of a recommended action to a user from whom the online system receives a content item having one or more specific characteristics. A description of a recommended action transmitted to a client device identifies a channel for presentation of the description of the recommended action by the client device. A channel specifies a format in which the description of the recommended action is presented as well as presentation of the description of the recommended action relative to other content. For example, a channel presents the description of the recommended action adjacent to information describing a content item provided to the online system by a user. As another example, a channel presents the description of the recommended action adjacent to content items selected for presentation to the user by the online system (e.g., adjacent to a feed of content items presented to the user by the online system). In another example, a channel presents the description of the recommended action in a feed of content items presented to the user by the online system. In various embodiments, the online system determines a channel for presenting the description of the recommended action based on information logged by the online system identifying prior presentation of the description of the recommended action via various channels and actions with the description of the recommended action by users to whom the description of the recommended action was presented by different channels.

As various client devices that received descriptions of recommended actions present the descriptions of recommended action to users, the online system receives information describing presentation of the descriptions of the recommended actions from the client devices. In various embodiments, the online system receives information identifying the description of the recommended action presented by a client device and identifying a channel with which the description of the recommended action was presented. Additionally, if a user performs an action with the description of the recommended action presented by a client device, the online system receives information from the client device identifying the description of the recommended action, identifying the user who performed the action, identifying the action with the description of the recommended action performed by the user, and the channel used to present the description of the recommended action.

As the online system receives information from client devices describing presentation of descriptions of recommended actions and actions with descriptions of recommended actions, the online system maintains numbers of times different descriptions of recommended actions were presented using various channels and numbers of times different actions were performed with different descriptions of recommended actions. In various embodiments, the online system maintains a counter for each combination of description of a recommended action and channel, and maintains an additional counter for each combination of description of a recommended action, channel, and action with the description of a recommended action. When the online system receives an indication a description of a recommended action was presented via a channel, the online system increments the counter for a combination of the description of the recommended action and the channel. Similarly, when the online system receives an indication a user performed a specific action with the description of the recommended action presented via the channel, the online system increments the additional counter associated with the combination of the description of the recommended action, the channel, and the specific action performed. In various embodiments, the online system maintains the counters and the additional counters for a specific time interval, so a counter specifies a number of times a description of a recommended action was presented via a particular channel during the specific time interval and an additional counter specifies a number of times a particular action was performed with a description of a recommended action presented via the particular channel during the specific time interval. In the preceding embodiments, the online system periodically resets the counters and the additional counters after the specific time interval. Alternatively, the online system maintains timestamps associated with different combinations of descriptions of recommended actions and channels indicating when the online system received information from a client device indicating a description of a recommended action was presented by a channel. Similarly, the online system maintains timestamps associated with different combinations of descriptions of recommended actions, channels, and actions with descriptions of recommended action indicating when the online system received information from a client device indicating a user performed an action with a description of a recommended action presented by a channel.

The online system retrieves stored information describing a number of times one or more descriptions of recommended actions were presented by a channel and determines a sampling rate for the channel based on the number of times one or more descriptions of recommended actions were presented by the channel during the specific time interval. In various embodiments, the online system identifies a channel and aggregates counters for combinations of the channel and one or more descriptions of recommended actions. Based on the aggregated counters for combinations of the channel and the one or more description of recommended actions, the online system determines the sampling rate for sampling information describing presentation of one or more descriptions of recommended actions presented via the channel during the specific time interval. Alternatively, the online system determines a sampling rate for a combination of a channel and a description of a recommended action based the counter identifying the number of times the description of the recommended action was presented by the channel during the specific time interval. The online system determines a sampling rate for each channel or for each combination of channel and description of a recommended action in various embodiments.

Similarly, the online system determines additional sampling rates for different actions performed with descriptions of recommended actions presented via one or more channels in various embodiments based on the numbers of occurrences of the actions with one or more descriptions of the recommended action presented by the channel during the specific time interval. In some embodiments, the online system determines a number of occurrences of an action with a description of a recommended action presented by various channels during the specific time interval and determines the additional sampling rate for the action based on the number of occurrences of the action with the description of the recommended action during the specific time interval. Accordingly, in various embodiments, the online system determines the additional sampling rate for an action with a description of a recommended action based on a total number of occurrences of the action with the description of the recommended action or based on a number of occurrences of the action with the description of the recommended action presented by a particular channel. The online system determines an additional sampling rate for each action or for each combination of channel and action with a description of a recommended action in various embodiments.

The online system samples received information describing presentation of a description of a recommended action via the channel using the sampling rate determined for the combination of the channel and the description of the recommended action and similarly samples received information describing occurrences of the action with one or more descriptions of a recommended action presented by a channel (or presented by multiple channels) using the additional sampling rate determined for a combination of the action and the channel (or for the action). The online system stores the sampled information describing presentation of the description of the recommended action via the channel in association with the description of the recommended action and the channel in various embodiments; similarly, the online system stores the sample information describing actions with one or more descriptions of recommended action in association with the actions. Determining a sampling rate for each channel based on numbers of times a description of a recommended action, or descriptions of one or more recommended actions, were presented via the channel during a specific time interval allows the online system to differently sample information describing presentation of descriptions of recommended actions presented via different channels based on prior usage of the different channels to present one or more descriptions of recommended actions during the specific time interval. Similarly, determining an additional sampling rate for each action or for each combination of a channel and an action, based on numbers occurrences of an action with descriptions of recommended actions during the specific time interval, allowing the online system to sample information describing actions with descriptions of recommended actions based frequencies with which different actions with descriptions of recommended actions occur during the specific time interval. This allows the online system to more efficiently allocate storage resources to information describing presentation of descriptions of recommended actions via different channels or describing different actions with descriptions of recommended actions presented to users, while also allowing accurate sampling of information describing presentation of descriptions of recommended actions via different channels or describing different actions with descriptions of recommended actions.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
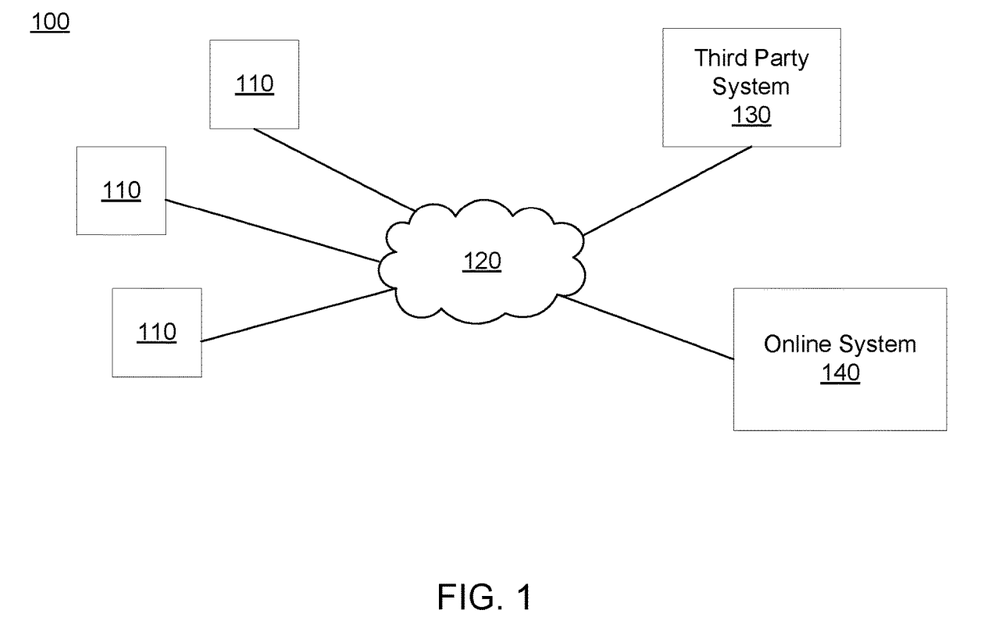
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 140 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item. This allows the user to more easily access the page of content.

Figure 2:
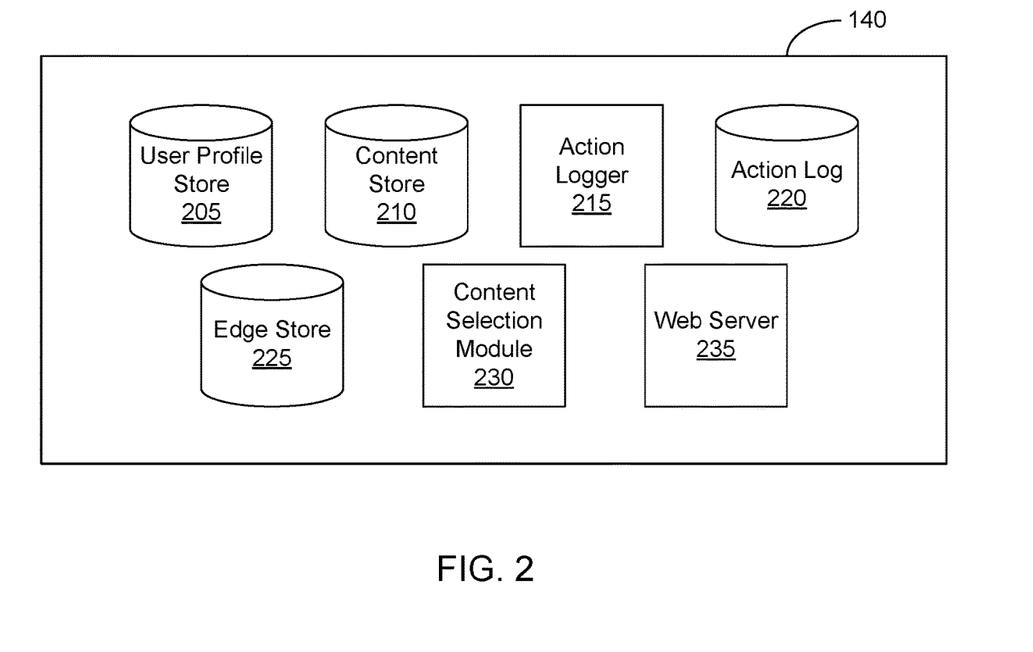
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Another example of content represented by an object is a description of a recommended action for a user of the online system to perform. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. The creative is text, image, audio, video, or any other suitable data presented to a user. In various embodiments, the creative also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

In various embodiments, the action logger 215 receives information from various client devices 110 describing presentation of content items, such as descriptions of recommended actions, to users. The action logger 215 also receives information from client devices 110 describing actions by users with content items, such as descriptions of recommended actions, presented by the client devices 110. As the action logger 215 may receive information describing presentation of or interaction with content items from a large number of client devices 110, the action logger 215 samples the received information and stores the resulting sampled information in the action log 220. This allows the online system 140 to maintain information describing presentation of or interaction with content items by users in the action log 220, while limiting storage resources used for the action log 220. However, different content items may be presented with different frequencies and users may interact with presented content items at different frequencies. As further described below in conjunction with FIG. 3, the action logger 215 determines different sampling rates for different actions with content items or for different presentation of content items based on prior interactions by users with the content items and prior presentation of the content item. This allows the action logger 215 to more accurately sample information describing different actions with content items or describing different presentations of content items, while more efficiently using storage resources of the action log 220 to store information describing different actions with content items or different presentations of content items.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements or other content with which the user engaged, purchases made, and other patterns from shopping and buying. Hence, the action log 220 may include information identifying content provided by one or more third party systems 130 that a user of the online system 140 has accessed or content provided by one or more third party systems 130 with which the user of the online system 140 otherwise interacted. Various third party systems 130 may include tracking mechanisms in content comprising instructions that, when executed by a client device 110, provide information identifying the content and identifying a user of the online system 140 associated with the client device 110 to the online system 140. In various embodiments, the information provided by the tracking mechanism identifies one or more products associated with a third party system 130 and include in, or otherwise associated with, the identified content. The information identifying the content is stored in the action log 220 in association with information identifying the user to the online system 140. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S.

patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. When determining measures of relevance, the content selection module 230 accounts for prior actions with a content item by users to whom the content item was presented and prior presentation of the content item to various users. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items that are not associated with bid amounts, such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Logging Information Describing Presentation of Recommendations of Actions

Figure 3:
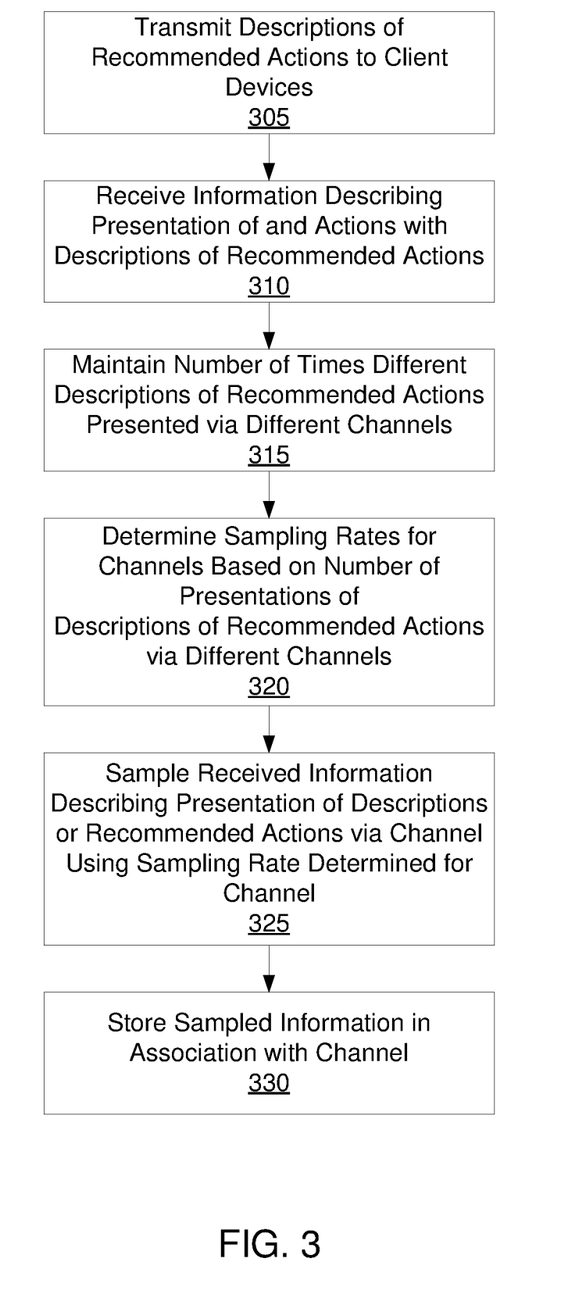
FIG. 3 is a flowchart of a method for logging information at an online system describing presentation of recommendation of actions to users of the online system, in accordance with an embodiment.

FIG. 3 is a flowchart of one embodiment of a method for an online system 140 logging information describing presentation of recommendation of actions to users. In other embodiments, the method may include different and/or additional steps than those shown in FIG. 3. Additionally, steps of the method may be performed in different orders than the order described in conjunction with FIG. 3 in various embodiments.

As a publishing user provides content to the online system 140, the online system 140 identifies one or more recommended actions for the publishing user to perform to increase presentation of the content to other users or to increase interaction with the content by other users. For example, a recommended action identifies a distribution channel for content provided by the publishing user or describes a format for the content to increase a likelihood of users interacting with the content. As another example, a recommended action presents recommended values for one or more characteristics of a content item to the publishing user. The online system 140 selects recommended actions for one or more publishing users based on prior presentation of descriptions of various recommended actions to users and actions with the descriptions of recommended actions by the users. For example, the online system 140 maintains a log of descriptions of recommended actions presented to various users and actions performed by users with the descriptions of recommended actions, as further described above in conjunction with FIG. 2. The online system 140 applies one or more models to characteristics of a publishing user, characteristics of a content item provided to the online system 140 by the publishing user, characteristics of users who performed one or more actions with previously presented descriptions of recommended actions, and characteristics of one or more content items provided to the online system 140 by the users who performed the one rom reo actions with previously presented descriptions of recommended actions.

The online system 140 transmits 305 descriptions of recommended actions to client devices 110 associated with users of the online system 140 providing content items to the online system 140 for presentation to other users. In some embodiments, the online system 140 transmits 305 a description of a recommended action to a user from whom the online system 140 receives a content item having one or more specific characteristics (e.g., a bid amount). A description of a recommended action transmitted 305 to a client device 110 identifies a channel for presentation of the description of the recommended action by the client device 110. A channel specifies a format in which the description of the recommended action is presented as well as presentation of the description of the recommended action relative to other content. For example, a channel presents the description of the recommended action adjacent to information descripting a content item provided to the online system 140 by a user. As another example, a channel presents the description of the recommended action adjacent to content items selected for presentation to the user by the online system 140 (e.g., adjacent to a feed of content items presented to the user by the online system 140). In another example, a channel presents the description of the recommended action in a feed of content items presented to the user by the online system 140. In various embodiments, the online system 140 determines a channel for presenting the description of the recommended action based on information logged by the online system 140 identifying prior presentation of the description of the recommended action via various channels and actions with the description of the recommended action by users to whom the description of the recommended action was presented by different channels.

As various client devices 110 that received descriptions of recommended actions present the descriptions of recommended action to users, the online system 140 receives 310 information describing presentation of the descriptions of the recommended actions from the client devices 110. In various embodiments, the online system 140 receives 310 information identifying the description of the recommended action presented by a client device 110 and identifying a channel with which the description of the recommended action was presented. Additionally, if a user performs an action with the description of the recommended action presented by a client device 110, the online system 140 receives 310 information from the client device 110 identifying the description of the recommended action, identifying the user who performed the action, identifying the action with the description of the recommended action performed by the user, and the channel used to present the description of the recommended action.

As the online system 140 receives 310 information from client devices 110 describing presentation of descriptions of recommended actions and actions with descriptions of recommended actions, the online system 140 maintains 315 numbers of times different descriptions of recommended actions were presented using various channels and numbers of times different actions were performed with different descriptions of recommended actions. In various embodiments, the online system 140 maintains a counter for each combination of description of a recommended action and channel, and maintains an additional counter for each combination of description of a recommended action, channel, and action with the description of a recommended action. When the online system 140 receives 310 an indication a description of a recommended action was presented via a channel, the online system 140 increments the counter for a combination of the description of the recommended action and the channel. Similarly, when the online system 140 receives 310 an indication a user performed a specific action with the description of the recommended action presented via the channel, the online system 140 increments the additional counter associated with the combination of the description of the recommended action, the channel, and the specific action performed. In various embodiments, the online system 140 maintains the counters and the additional counters for a specific time interval, so a counter specifies a number of times a description of a recommended action was presented via a particular channel during the specific time interval and an additional counter specifies a number of times a particular action was performed with a description of a recommended action presented via the particular channel during the specific time interval. In the preceding embodiments, the online system 140 periodically resets the counters and the additional counters after the specific time interval. Alternatively, the online system 140 maintains timestamps associated with different combinations of descriptions of recommended actions and channels indicating when the online system 140 received 310 information from a client device 110 indicating a description of a recommended action was presented by a channel. Similarly, the online system 140 maintains timestamps associated with different combinations of descriptions of recommended actions, channels, and actions with descriptions of recommended action indicating when the online system 140 received 310 information from a client device 110 indicating a user performed an action with a description of a recommended action presented by a channel.

The online system 140 retrieves 315 stored information describing a number of times one or more descriptions of recommended actions were presented by a channel during the specific time interval and determines 320 a sampling rate for the channel based on the number of times one or more descriptions of recommended actions were presented by the channel during the specific time interval. In various embodiments, the online system 140 identifies a channel and aggregates counters for combinations of the channel and one or more descriptions of recommended actions. Based on the aggregated counters for combinations of the channel and the one or more description of recommended actions, the online system 140 determines 320 the sampling rate for sampling information describing presentation of one or more descriptions of recommended actions presented via the channel. Alternatively, the online system 140 determines 320 a sampling rate for a combination of a channel and a description of a recommended action based the counter identifying the number of times the description of the recommended action was presented by the channel during the specific interval. The online system 140 determines 320 a sampling rate for each channel or for each combination of channel and description of a recommended action in various embodiments.

In various embodiments, the online system 140 stores associations between sampling rates and numbers of times descriptions of one or more recommended actions were presented by a channel and determines 320 the sampling rate for the channel by selecting a sampling rate associated with a number of times descriptions of one or more recommended actions were presented by the channel that matches the number of times one or more descriptions of recommended actions were presented by the channel during the specific time interval determined 320 from the retrieved information. Alternatively, the online system 140 selects a sampling rate associated with a number of times a description of a specific recommended action was presented that matches the number of times the description of the specific recommended action was presented by the channel during the specific time interval determined 320 from the retrieved information. In other embodiments, the online system 140 stores associations between sampling rates and ranges of numbers of times descriptions of one or more recommended actions were presented by a channel during the specific time interval and determines 320 the sampling rate for the channel by selecting a sampling rate associated with a range including the number of times one or more descriptions of recommended actions were presented by the channel during the specific time interval determined 320 from the retrieved information. Alternatively, the online system 140 selects a sampling rate associated with a range including the number of times the description of the specific recommended action was presented by the channel determined 320 from the retrieved information.

The online system 140 samples 325 received information describing presentation of a description of a recommended action via the channel using the sampling rate determined 320 for the combination of the channel and the description of the recommended action and stores 330 the sampled information describing presentation of the description of the recommended action via the channel in association with the description of the recommended action and the channel in various embodiments. Alternatively, the online system 140 samples 325 received information describing presentation of descriptions of recommended actions via the channel using the sampling rate determined 320 for the channel. Subsequently, the online system 140 stores 330 the sampled information in association with the channel. As described above, the online system 140 determines 320 a sampling rate for each channel, or for each combination of a channel and a description of a recommended action, based on numbers of times a description of a recommended action, or descriptions of one or more recommended actions, were presented via the channel during a specific time interval. This allows the online system 140 to sample information describing presentation of descriptions of recommended actions presented via different channels using different sampling rates based on prior usage of the different channels to present one or more descriptions of recommended actions.

Similarly, the online system 140 determines additional sampling rates for different actions performed with descriptions of recommended actions presented via one or more channels in various embodiments. The online system 140 retrieves stored information describing a number occurrences of an action with a description of a recommended action were presented by a channel during the specific time interval and determines an additional sampling rate for the action based on the number of occurrences of the action with the description of the recommended action presented by the channel. Alternatively, the online system 140 determines a number of occurrences of an action with a description of a recommended action presented by various channels and determines the additional sampling rate for the action based on the number of occurrences of the action with the description of the recommended action during the specific time interval. Accordingly, in various embodiments, the online system 140 determines the additional sampling rate for an action with a description of a recommended action based on a total number of occurrences of the action with the description of the recommended action during the specific time interval or based on a number of occurrences of the action with the description of the recommended action presented by a particular channel during the specific time interval. The online system 140 determines an additional sampling rate for each action or for each combination of channel and action with a description of a recommended action in various embodiments.

In various embodiments, the online system 140 stores associations between additional sampling rates and numbers of occurrences of an action with a description of a recommended action and determines the additional sampling rate for the action by selecting a sampling rate associated with a number of occurrences of the action with a descriptions of one or more recommended actions presented by a channel or presented by one or more channels that matches the number of occurrences of the action with one or more descriptions of recommended actions presented by a channel (or presented by one or more channels) during the specific time interval from the retrieved information. In other embodiments, the online system 140 stores associations between additional sampling rates and ranges of occurrences of an action with one or more recommended actions presented by a channel (or by multiple channels) and determines the additional sampling rate for the action by selecting an additional sampling rate associated with a range including the number of occurrences of the action with descriptions of recommended actions were presented by the channel (or by multiple channels) during the specific time interval determined from the retrieved information.

Using the additional sampling rate determined for an action, the online system 140 samples received information describing occurrences of the action with one or more descriptions of a recommended action presented by a channel (or presented by multiple channels) using the additional sampling rate determined for a combination of the action and the channel (or for the action) and stores the sampled information describing actions with one or more descriptions of the recommended action in various embodiments.

The online system 140 may sample information describing actions with descriptions of recommended actions based on any suitable combination of one or more of: description of recommended action, channel, and action and store the sampled information in association with a corresponding combination of one or more of: description of recommended action, channel, and action. The online system 140 may determine an additional sampling rate for each action or for each combination of a channel and an action, based on numbers occurrences of an action with descriptions of recommended actions, allowing the online system 140 to sample information describing actions with descriptions of recommended actions based frequencies with which different actions with descriptions of recommended actions occur during a specific time interval.

Figure 4:
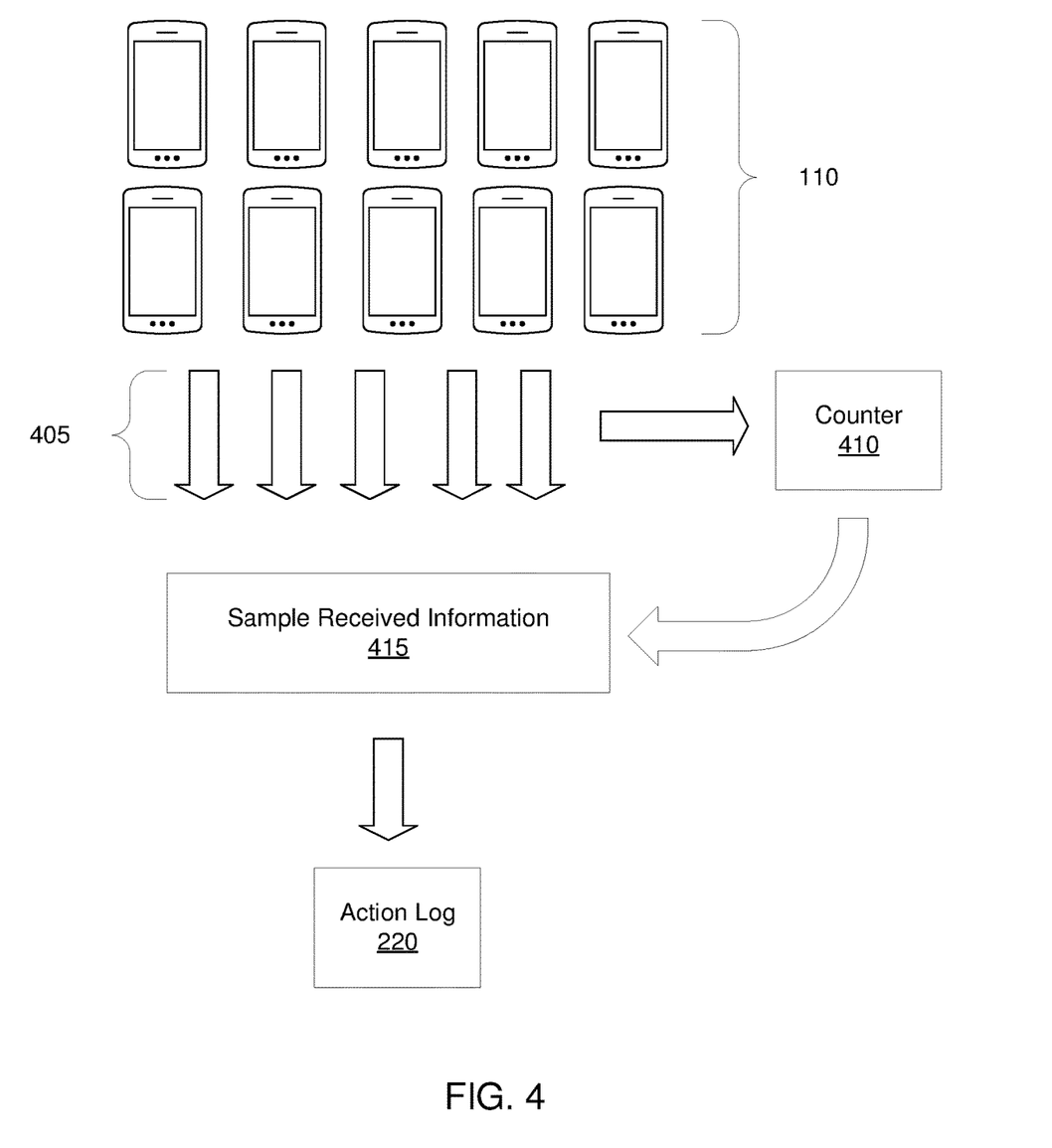
FIG. 4 is a process flow diagram of an online system logging information describing presentation of content to users based on prior presentation of the content, in accordance with an embodiment.

FIG. 4 is a process flow diagram of an online system 140 logging information describing presentation of content to users based on prior presentation of the content. In the example of FIG. 4, the online system 140 receives information 405 from various client devices 110 describing presentation describing presentation of content items, such as descriptions of recommended actions, to users of the online system 140. As further described above in conjunction with FIG. 3, information 405 received from a client device 110 may describe presentation of the content item by the client device 110 (e.g., a channel used to present the content item via the client device 110) or may describe an action by a user with the content item via the client device 110 (e.g., a selection of the content item by a user). Based on the information 405 received from client devices 110, the online system 140 maintains information describing a number of times content items were presented in various manners by the client device 110, describing a number of different actions with content items performed by users to whom the content items were presented, or describing occurrences of any suitable information describing presentation of the content items. In the example of FIG. 4, the online system 140 maintains a counter 410 identifying a number of a specific action by users during a specific time interval with a content item presented by various client devices 110. While FIG. 4 shows a single counter 410 for purposes of illustration, as further described above in conjunction with FIG. 3, the online system 140 maintains multiple counters, each associated with different actions with one or more content items, or with different manners of presentation of content items.

As further described above in conjunction with FIG. 4, based on the counter 410, the online system 140 determines a sampling rate for the received information 405. In various embodiments, the sampling rate for the specific action for which the counter 410 identifies the number of occurrences during the specific time interval is directly related to the number of occurrences identified by the counter 410. This allows the online system 140 to increase the sampling rate of the received information 405 identifying the specific action when the specific action occurs more frequently during the specific time interval and to decrease the sampling rate of the received information 405 identifying the specific action when the specific action occurs less frequently during the specific time interval. The online system 140 samples 415 the received information 405 identifying the specific action using the determined sampling rate and stores the sampled information in the action log 220. Hence, the online system 140 modifies an amount of storage resources allocated by the action log 220 for information describing the specific action based on a number of occurrences of the specific action during a specific time interval. By maintaining different counters 410 for different actions or different presentations of a content item, the online system 140 more efficiently allocates storage resources to different actions or to different presentations of the content item based on numbers of occurrences of different actions or different presentations of the content item.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

transmitting descriptions of recommended actions selected by an online system to client devices associated with users of the online system, each recommended action for presentation via one or more channels;

receiving information, at the online system, from one or more client devices identifying a description of a recommended action, a channel used to present the recommended action, and an action with the recommended action;

retrieving information stored by the online system identifying a number of times a content item was presented by each of one or more channels during a specific time interval;

determining a sampling rate for each of the one or more channels based on the number of times the content item was presented by each of one or more channels during the specific time interval by:

retrieving stored associations between numbers of times the description of the recommended action was presented by the channel and sampling rates; and selecting a sampling rate associated with a number of times the description of the recommended action was presented by the channel matching the number of times the description of the recommended action was presented by each of one or more channels during the specific time interval;

sampling the received information describing presentation of the description of the recommended action by each of one or more channels, information describing presentation of the description of the recommended action by the channel sampled at the sampling rate determined for the channel; and storing the sampled information describing presentation of the description of the recommended action by each of the one or more channels at the online system.

2. The method of claim 1, wherein the sampling rate determined for the channel is directly related to the number of times the description of the recommended action was presented by the channel during the specific time interval.

3. The method of claim 1, wherein the sampling rate determined for the channel is directly proportional to the number of times the description of the recommended action was presented by the channel during the specific time interval.

4. The method of claim 1, wherein determining the sampling rate for each of the one or more channels based on the number of times the description of the recommended action was presented by each of one or more channels during the specific time interval comprises:

retrieving stored associations between ranges of numbers of times the description of the recommended action was presented by the channel and sampling rates; and selecting a sampling rate associated with range of numbers of times the description of the recommended action was presented by the channel including the number of times the description of the recommended action was presented by each of one or more channels during the specific time interval.

5. The method of claim 1, further comprising:

retrieving information stored by the online system identifying a number of occurrences of each of one or more actions with the description of the recommended action during the specific time interval;

determining an additional sampling rate for each of the one or more actions based on the number of occurrences of each of one or more actions with the description of the recommended action during the specific time interval;

sampling the received information describing occurrences of each of the one or more actions with the description of the recommended action, information describing occurrences of the action with the description of the recommended action sampled at the additional sampling rate determined for the action; and storing the sampled information describing occurrences of each of the one or more actions with the description of the recommended action at the online system.

6. The method of claim 5, wherein determining the additional sampling rate for each of the one or more actions based on the number of occurrences of each of one or more actions with the description of the recommended action during the specific time interval comprises:

retrieving stored associations between numbers of occurrences of a specific action with the description of the recommended action and additional sampling rates; and selecting an additional sampling rate associated with a number of occurrences of the specific action with the description of the recommended action matching the number of occurrences of the specific action during the specific time interval.

7. The method of claim 5, wherein determining the sampling rate for each of the one or more channels based on the number of times the description of the recommended action was presented by each of one or more channels during the specific time interval comprises:

retrieving stored associations between ranges of occurrences of a specific action with the description of the recommended action and additional sampling rates; and selecting an additional sampling rate associated with range of occurrences of a specific action with the description of the recommended action and additional sampling rates including the number of occurrences of the specific action with the description of the recommended action and additional sampling rates during the specific time interval.

8. The method of claim 5, wherein retrieving information stored by the online system identifying the number of occurrences of each of one or more actions with the description of the recommended action during the specific time interval comprises:

maintaining a counter for each of the one or more actions, the counter maintained for an action identifying the number of occurrences of the action during the specific time interval based on information received by the online system from client devices; and retrieving the counters maintained for each of the one or more actions.

9. The method of claim 1, wherein retrieving information stored by the online system identifying the number of times the content item was presented by each of one or more channels during a specific time interval comprises:

maintaining a counter for each of the one or more channels, the counter maintained for the channel action identifying the number of times the description of the recommended action was presented by the channel during the specific time interval based on information received by the online system from client devices; and retrieving the counters maintained for the one or more channels.

10. A computer program product comprising a computer readable storage medium having instructions encoded thereon that, when executed by a processor, cause the processor to:
- transmit descriptions of recommended actions selected by an online system to client devices associated with users of the online system, each recommended action for presentation via one or more channels;
- receive information, at the online system, from one or more client devices identifying a description of a recommended action, a channel used to present the recommended action, and an action with the recommended action;
- retrieve information stored by the online system identifying a number of times a content item was presented by each of one or more channels during a specific time interval;
- determine a sampling rate for each of the one or more channels based on the number of times the content item was presented by each of one or more channels during the specific time interval by:
  - retrieving stored associations between numbers of times the description of the recommended action was presented by the channel and sampling rates; and
  - selecting a sampling rate associated with a number of times the description of the recommended action was presented by the channel matching the number of times the description of the recommended action was presented by each of one or more channels during the specific time interval;
- sample the received information describing presentation of the description of the recommended action by each of one or more channels, information describing presentation of the description of the recommended action by the channel sampled at the sampling rate determined for the channel; and
- store the sampled information describing presentation of the description of the recommended action by each of the one or more channels at the online system.

11. The computer program product of claim 10, wherein the sampling rate determined for the channel is directly related to the number of times the description of the recommended action was presented by the channel during the specific time interval.

12. The computer program product of claim 10, wherein the sampling rate determined for the channel is directly proportional to the number of times the description of the recommended action was presented by the channel during the specific time interval.

13. The computer program product of claim 10, wherein determine the sampling rate for each of the one or more channels based on the number of times the description of the recommended action was presented by each of one or more channels during the specific time interval comprises:
- retrieve stored associations between ranges of numbers of times the description of the recommended action was presented by the channel and sampling rates; and
- select a sampling rate associated with range of numbers of times the description of the recommended action was presented by the channel including the number of times the description of the recommended action was presented by each of one or more channels during the specific time interval.

14. The computer program product of claim 10, wherein the computer readable storage medium further has instructions encoded thereon that, when executed by the processor, cause the processor to:
- retrieve information stored by the online system identifying a number of occurrences of each of one or more actions with the description of the recommended action during the specific time interval;
- determine an additional sampling rate for each of the one or more actions based on the number of occurrences of each of one or more actions with the description of the recommended action during the specific time interval;
- sample the received information describing occurrences of each of the one or more actions with the description of the recommended action, information describing occurrences of the action with the description of the recommended action sampled at the additional sampling rate determined for the action; and
- store the sampled information describing occurrences of each of the one or more actions with the description of the recommended action at the online system.

15. The computer program product of claim 14, wherein determine the additional sampling rate for each of the one or more actions based on the number of occurrences of each of one or more actions with the description of the recommended action during the specific time interval comprises:
- retrieve stored associations between numbers of occurrences of a specific action with the description of the recommended action and additional sampling rates; and
- select an additional sampling rate associated with a number of occurrences of the specific action with the description of the recommended action matching the number of occurrences of the specific action during the specific time interval.

16. The computer program product of claim 14, wherein determine the sampling rate for each of the one or more channels based on the number of times the description of the recommended action was presented by each of one or more channels during the specific time interval comprises:
- retrieve stored associations between ranges of occurrences of a specific action with the description of the recommended action and additional sampling rates; and
- select an additional sampling rate associated with range of occurrences of a specific action with the description of the recommended action and additional sampling rates including the number of occurrences of the specific action with the description of the recommended action and additional sampling rates during the specific time interval.

17. The computer program product of claim 14, wherein retrieve information stored by the online system identifying the number of occurrences of each of one or more actions with the description of the recommended action during the specific time interval comprises:
- maintain a counter for each of the one or more actions, the counter maintained for an action identifying the number of occurrences of the action during the specific time interval based on information received by the online system from client devices; and
- retrieve the counters maintained for each of the one or more actions.

18. The computer program product of claim 10, wherein retrieve information stored by the online system identifying the number of times the content item was presented by each of one or more channels during a specific time interval comprises:
    maintain a counter for each of the one or more channels, the counter maintained for the channel action identifying the number of times the description of the recommended action was presented by the channel during the specific time interval based on information received by the online system from client devices; and
    retrieve the counters maintained for the one or more channels.

\* \* \* \* \*

UNITED STATES PATENT AND TRADEMARK OFFICE
CERTIFICATE OF CORRECTION

PATENT NO. : 10,621,256 B2
APPLICATION NO. : 15/721671
DATED : April 14, 2020
INVENTOR(S) : Honglu He et al.

Page 1 of 1

It is certified that error appears in the above-identified patent and that said Letters Patent is hereby corrected as shown below:

In the Claims

Column 20, Lines 39-40, Claim 7, delete "an additional sampling rate associated with range of occurrences" and insert -- an additional sampling rate associated with a range of occurrences --.

Column 21, Line 62, Claim 13, delete "a sampling rate associated with range of numbers" and insert -- a sampling rate associated with a range of numbers --.

Column 22, Line 47, Claim 16, delete "an additional sampling rate associated with range of occurrences" and insert -- an additional sampling rate associated with a range of occurrences --.

Signed and Sealed this
Twentieth Day of October, 2020

Andrei Iancu
*Director of the United States Patent and Trademark Office*